Dec. 3, 1940.    N. J. SMITH    2,224,024
PRESSURE GAUGE
Filed Oct. 4, 1937

Witness
Paul F. Bryant

Inventor
Thomas J. Smith
by his Attorneys

Patented Dec. 3, 1940

2,224,024

UNITED STATES PATENT OFFICE 2,224,024

PRESSURE GAUGE

Norman J. Smith, Medfield, Mass., assignor to Crosby Steam Gage & Valve Company, Boston, Mass., a corporation of Massachusetts Application October 4, 1937, Serial No. 167,234

2 Claims. (Cl. 73—110)

The present invention relates to pressure gauges, and more particularly to gauges of this type employed for the indication of comparatively low pressures transmitted to the gauge mechanism through a diaphragm or its equivalent.

The purpose and object of my invention is to provide an improved form of calibrating spring in gauge mechanisms of this type which shall have a comparatively large available restoring movement when distorted without interference while retaining the desired degree of flexibility.

With this and other objects in view, I have provided a multiple-leaf spring which forms in effect a hollow beam distortable under pressure exerted by the diaphragm, but with a predetermined and stable restoring action causing the hollow beam to assume its normal condition when pressure upon the diaphragm ceases or is diminished. I have found that the use of this type of restoring spring creates a closer response of the gauge hand to changing pressures with less tendency to fluctuate upon stabilization of pressure, and with an accurate return to zero reading conditions when atmospheric pressure exists.

Still further features of the invention consist in certain novel features of construction, combinations and arrangements of parts hereinafter described and claimed, the advantages of which will be obvious to those skilled in the art from the following description.

Figure 3:
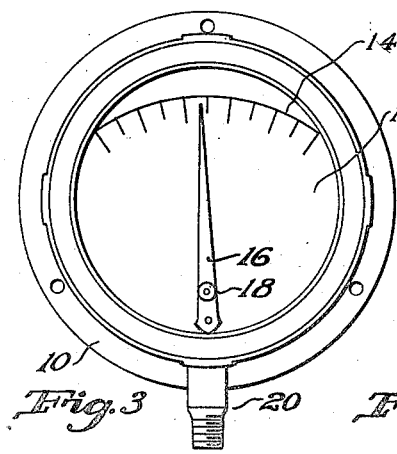
Figure 4:
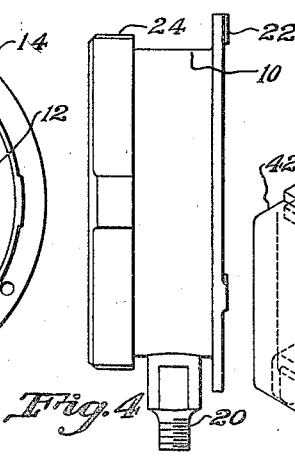
Figure 5:
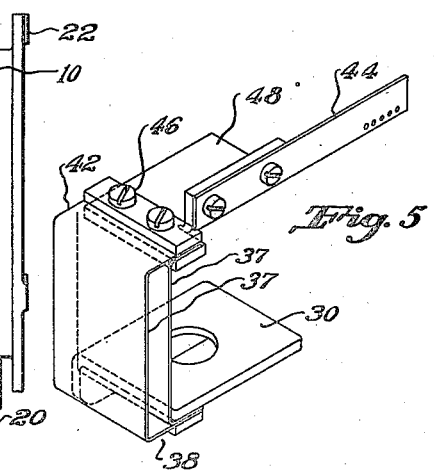
Figure 1:
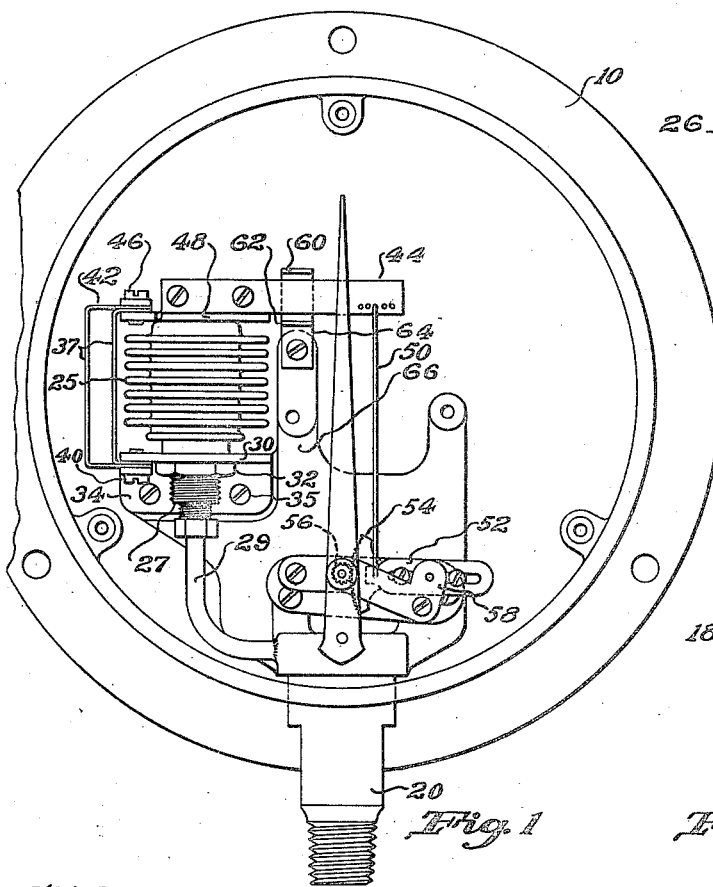
Figure 2:
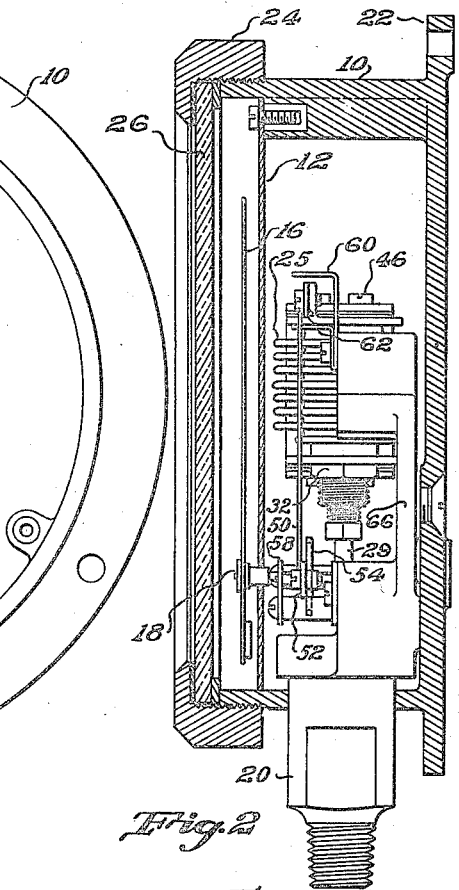

In the accompanying drawing illustrating the preferred form of the invention, Fig. 1 is an elevation of the gauge mechanism enclosed in the usual housing; Fig. 2 is a section at right angles to the mechanism shown in Fig. 1; Fig. 3 is a view of the gauge dial upon a reduced scale, illustrating the manner in which the gauge indicates pressures above and below atmospheric; Fig. 4 is a side elevation of the gauge shown in Fig. 3; and Fig. 5 is a detail illustrating the actuator lever and restoring springs with the mounting therefor.

Referring more particularly to the illustrated embodiment of the invention, the gauge mechanism is housed in a case 10 of conventional form, having a dial 12 provided with a reading scale 14 which may be calibrated to indicate pressures above and below atmospheric. A gauge hand or pointer 16 pivoted at 18 moves across the calibrations on the dial, and a threaded socket 20 serves to connect the gauge with the conventional pressure outlet. As indicated more particularly in Fig. 2, the gauge case 10 is provided with an attaching flange 22 and with a retaining ring 24 which engages and retains the usual glass front 26.

The gauge mechanism for operating the hand 16 comprises a diaphragm 25 in the form of a metallic bellows closed at its upper end and having its open lower end connected and sealed through the fitting 27 with a pressure duct 29 connected with the passage in the socket 20. The bellows so connected obviously expands and contracts in accordance with the fluctuations of pressure transmitted through the socket, as will be evident to those skilled in the art. The bellows is rigidly connected at its lower end with a base-supporting plate 30 through a lock nut 32. This base is in turn connected to the case through a down-turned flange 34 and screws 35.

Also connected to the base 30 are parallel leaf springs 37 rigidly supported at the bottom through flanges 38 connected to the base by set screws 40. These springs are provided with similar flanges 42 at the upper edges which are interconnected and also connected to an actuator lever 44 through set screws 46. This construction forms in effect a hollow distortable beam having the normal position shown in the drawing, but distortable laterally when pressure is exerted through the bellows diaphragm on the plate 48 with which the bellows head engages. This distortion of the box spring rocks the actuator lever 44 which is connected at its free end with the pointer mechanism through a link 50 connected at its opposite end to a rocker arm 52 which in turn is adjustably connected with a gear segment 54 meshing with and operating a gear 56 mounted on the hand pivot. The pivot for the rocker arm and gear segment has an outboard bearing in a fixed plate 58, as indicated in Fig. 1.

The foregoing construction when pressure is transmitted through the bellows serves to rock the actuator lever and compel lateral distortion of the bellows. The movements of the lever in either direction are confined and limited by stops 60 and 62 positioned at opposite sides of the lever and formed on a member 64 connected to the base 66 of the gauge mounting.

What is claimed is:

1. A gauge, comprising a flexible diaphragm, an operating lever, parallel and spaced leaf springs fixedly connected to one end of the lever and providing a fulcrum therefor, a stationary base to which the parallel springs are fixedly connected and anchored at their opposite ends, the fixed connections at opposite ends of the spaced springs causing the springs to act as a unit and to restore the operating lever to a normal position with a minimum of hunting after movement from such normal position by the diaphragm, an indicating hand, and motion transmission between the free end of the operating lever and the indicating hand.

2. A gauge, comprising a housing, a supporting base connected with the housing, an expansible diaphragm anchored at one end to the base, leaf springs disposed in parallel spaced relation and having supporting and connecting flanges at their lower ends, means for fixedly connecting the flanges to one another and to the supporting base, flanges at the upper free ends of the springs, an actuator lever movable by said diaphragm, means for connecting the flanges and actuator lever in fixed relationship to provide a fulcrum for the lever when moved by the flexible diaphragm in operative relation thereto, an indicating member, and motion transmission between the free end of the actuator lever and the hand.

NORMAN J. SMITH.